(12) United States Patent
Twardowski et al.

(10) Patent No.: US 7,361,276 B2
(45) Date of Patent: Apr. 22, 2008

(54) APPARATUS AND METHOD FOR OSMOTIC MEMBRANE DISTILLATION

(75) Inventors: Zbigniew Twardowski, Vancouver (CA); Thomas S. Drackett, Vancouver (CA); Dmitri Bessarabov, Vancouver (CA); Peter E. Fetissoff, Vancouver (CA)

(73) Assignee: Aker Kvaemer Canada Inc., Vancouver (CA)

( * ) Notice: Subject to any disclaimer, the term of this patent is extended or adjusted under 35 U.S.C. 154(b) by 528 days.

(21) Appl. No.: 11/141,490

(22) Filed: Jun. 1, 2005

(65) Prior Publication Data

US 2005/0269266 A1 Dec. 8, 2005

(30) Foreign Application Priority Data

Jun. 4, 2004 (CA) .................................. 2469769

(51) Int. Cl.
| | |
|---|---|
| B01D 61/36 | (2006.01) |
| C25B 1/00 | (2006.01) |
| C25B 1/14 | (2006.01) |
| C25B 1/24 | (2006.01) |
| B01D 63/00 | (2006.01) |

(52) U.S. Cl. ..................... 210/640; 205/334; 205/349; 205/359; 205/406; 205/407; 205/408; 205/409; 205/411; 205/457; 205/482; 205/498; 205/499; 205/501

(58) Field of Classification Search .................. None
See application file for complete search history.

(56) References Cited

U.S. PATENT DOCUMENTS 4,683,039 A * 7/1987 Twardowski et al. ........ 205/500

(Continued)

FOREIGN PATENT DOCUMENTS

DE 42 29 061 3/1994

(Continued)

OTHER PUBLICATIONS

Alklaibi et al., "Membrane-distillation desalination: status and potential", Desalination, 171:111-131 (2004).

(Continued)

*Primary Examiner*—Krishnan S Menon
(74) *Attorney, Agent, or Firm*—Morgan, Lewis & Bockius LLP (57) ABSTRACT

A method of enhancing the concentration of a first inorganic compound in a first aqueous solution of a first process of a heavy chemical plant, the method comprising (a) feeding the first solution having the first compound at a first concentration and a first water vapor pressure to an osmotic membrane distillation means comprising a hydrophobic, gas and water vapor permeable membrane separating (i) a first chamber for receiving the first solution, from (ii) a second chamber for receiving a receiver feed aqueous solution having a second water vapor pressure lower than the first water vapor pressure; (b) feeding the receiver aqueous feed solution to the second chamber as to effect transfer of water vapor through the membrane from the first chamber to the second chamber, and to produce (i) a resultant first solution having a second concentration of the first compound greater than the first concentration and (ii) a diluted receiver feed aqueous solution; and (c) collecting the resultant first solution. The apparatus and method are of particular value in electrolytic haloalkali production plants in offering reduced capital and operating re-concentration and dilution costs.

27 Claims, 4 Drawing Sheets

U.S. PATENT DOCUMENTS

| | | | |
|---|---|---|---|
| 4,781,837 A | 11/1988 | Lefebvre | |
| 5,098,566 A | 3/1992 | Lefebvre | |
| 5,382,365 A | 1/1995 | Deblay | |
| 5,824,223 A | 10/1998 | Michaels et al. | |
| 5,932,085 A * | 8/1999 | Cowley et al. | 205/499 |
| 5,938,928 A | 8/1999 | Michaels | |
| 5,965,004 A | 10/1999 | Cowley | 205/499 |
| 6,299,777 B1 | 10/2001 | Bowser | |
| 6,383,386 B1 | 5/2002 | Hying et al. | |
| 6,569,341 B2 | 5/2003 | Bowser | |
| 2002/0029974 A1 * | 3/2002 | Mobius et al. | 205/99 |

FOREIGN PATENT DOCUMENTS

GB     1082089     9/1967

OTHER PUBLICATIONS

P.A. Hogan et al., "A New Option : Osmotic Distillation", Chemical Engineering Progress, Jul. 1998 (not enclosed, will provide at a later date).

* cited by examiner

APPARATUS AND METHOD FOR OSMOTIC MEMBRANE DISTILLATION

FIELD OF THE INVENTION

This invention relates to apparatus and method for the recovery and concentration of heavy chemical liquors using osmotic membrane distillation, particularly spent alkali metal halide solutions from electrolytic cells and more particularly, spent sodium chloride solutions from the production of sodium hydroxide and chlorine gas.

BACKGROUND TO THE INVENTION

In the process of production of chlorine and caustic, a nearly saturated NaCl brine solution is fed to an electrolyzer, where upon application of DC current, chlorine gas is evolved at the anode while water is electrochemically reduced to gaseous hydrogen and hydroxyl ions at the cathode. Anode and cathode are typically separated by a microporous diaphragm or perfluorinated cation exchange membrane such as those known under the trademarks, Nafion®, Flemion® or Aciplex®. Some chloralkali plants may still utilize the older mercury-based process, in which there is no separator between the electrodes and the cathode reaction is formation of Na-amalgam.

All chloralkali plants require a purified brine feed, and in the case of membrane plants, the brine has to be "super pure", with the total hardness causing the metals content to be specified at less than 30 ppb. Raw NaCl brine is typically prepared from solid NaCl and water in a brine saturator. It then undergoes one or two stages of purification to remove the hardness metals, such as Ca and Mg, as well as other metallic and non-metallic impurities. Both chemical precipitation methods and ion exchange methods are commonly used to purify the NaCl brine for membrane cell plants. The brine preparation and processing stages are commonly referred to as the Brine Treatment section of the chloralkali plant and can account for up to 10-15% of the total plant cost. A detailed description of chloralkali brine preparation and purification is given, for example, in a chapter on Chlorine in *Industrial Inorganic Chemicals and Products—An Ullmann's Encyclopedia*, vol. 2, Wiley-VCH, Weinheim, 1999, pp. 1123-1255.

A typical concentration of the feed brine is 305±10 g/L and in the course of membrane cell electrolysis, the NaCl concentration gets depleted by approximately a third, i.e. to 190±10 g/L. Brine, after electrolysis, is called Spent Brine, Weak Brine or Return Brine. Spent Brine is first de-chlorinated and then, typically, returned to a brine saturator, as one of several make-up components to prepare the raw feed brine. It should be appreciated that Spent Brine is very pure, i.e. "super-pure", when in the membrane plant and its recycle to the brine saturator is solely for the purpose of getting it re-concentrated back to the original strength, i.e. the 305±10 g/L.

If a convenient and inexpensive way of re-concentrating Spent Brine back to Feed Brine strength were found, then the size, and therefore the cost, of the brine treatment section could be significantly reduced. There would also be a concomitant reduction in brine treatment chemical consumption, such as NaOH, $Na_2CO_3$ and IX resin regeneration chemicals. Unfortunately, use of conventional evaporation as a means of re-concentrating Spent Brine is deemed to be prohibitively expensive, since in the typical chloralkali plant there is no extra thermal energy, e.g. steam, available. Furthermore, due to corrosivity of the brine the evaporator would have to employ expensive metallurgy.

There is, therefore, a need for improved methods of re-concentrating Spent Brine to Feed Brine.

The mechanism of water vapor transfer across a membrane in Osmotic Membrane Distillation (OMD) is based on molecular diffusion, or, in the case of smaller membrane pores, a mixed molecular and Knudsen diffusion. In either case, the rate of transfer is proportional to the water vapor difference across the membrane, membrane porosity and the reciprocals of membrane thickness and tortuosity. Suitable membrane materials include, for example, microporous fluoropolymers PTFE, FEP, PFA, PVDF, and the like, polyolefins, such as, PP, PE, and polysulfones and the like. It is also possible to use microporous inorganic materials, including carbon and glass, provided that they have been made hydrophobic by either (i) mixing with any of the above polymers or (ii) surface treatment, e.g. with organic silicones. Alternatively, it is also possible to use a thin non-porous membrane film made of polymer characterized by high free volume which makes it permeable to gases and water vapor. Examples of such polymers are poly (1-trimethylsilyl-1-propyne) (PTMSP) or 2,2-bistrifluoromethyl-4,5-difluoro-1,3-dioxole/tetrafluoroethylene copolymer (Teflon AF® 2400) as a water vapor permeable membrane. The non-porous membrane gives positive assurance that there will be no intermixing of the aqueous streams, albeit, at the expense of a lower flux i.e. rate of water vapor transfer normalized to the membrane area.

A good description of the OMD technique is contained in a paper by P. A. Hogan et al., "*A New Option: Osmotic Distillation*", Chemical Engineering Progress, July 1998, incorporated herein as a reference. To date, OMD has been rarely used industrially, and almost exclusively for concentration of aqueous food process streams, such as juices, fermentation broths or pharmaceutical intermediates. In such applications, the user wants to avoid thermal degradation of the feed constituents, such as, for example, flavor compounds by limiting the OMD process operating temperature to the essentially ambient level. The receiver solution or "water sink" is, typically, a concentrated solution of $CaCl_2$, $MgCl_2$, NaCl, potassium hydrogen phosphate(s) or pyrophosphate(s). It is also possible to use low vapor pressure water-miscible organic solvents, such as ethylene glycol. In most cases, the spent i.e. diluted receiver solution is re-concentrated back to the original strength in the external evaporator. Thus, net input of thermal energy is required for the overall process. As mentioned, hereinabove, for common cases employing chloride-based receivers the evaporator would have to be made of expensive, corrosion-resistant alloys.

The phenomena of osmotic membrane distillation (OMD) has, to-date, been exploited almost exclusively for the purpose of concentration of heat-degradable food or pharmaceutical products, such as fruit juices, milk, coffee, enzymes, vitamins, and the like. The aforementioned products cannot, in general, be concentrated by conventional thermal evaporation, without negatively affecting their organoleptic or therapeutic properties.

U.S. Pat. No. 4,781,837, granted Nov. 1, 1988 to Lefebvre, Michel S. M., discloses an OMD process for concentration of fruit or vegetable juices, milk, whey, by contacting such, across a hydrophobic, microporous barrier with a highly concentrated receiver solution of salt, such as NaCl or $MgSO_4$. U.S. Pat. No. 4,781,837 also discloses a process whereby the spent receiver solution per se is re-concentrated, e.g. by Reverse Osmosis (RO) and re-cycled back to the OMD stage. The cited process temperature is 40° C. U.S. Pat. No. 4,781,837 also discloses a concept of extracting potable water from seawater, by a combination of OMD and RO.

U.S. Pat. No. 5,098,566, granted Mar. 24, 1992 to Lefebvre, Michel S. M. discloses a hydrophobic microporous membrane with optimized thickness and porosity, particularly useful for the OMD process. U.S. Pat. No. 5,098,566 explicitly teaches the differentiation between Membrane Distillation (MD) and OMD, with the former technique not being isothermal and always conducted under a significant a temperature gradient, i.e. 50° C. or so across the hydrophobic microporous membrane.

U.S. Pat. No. 5,382,365, granted Jan. 17, 1995 to Deblay is somewhat similar and exemplifies cases of OMD-enabled concentration of liquid pharmaceutical intermediates or grape juice as well as solid food products (sliced apples). The preferable dehydrating agent (Receiver) is a concentrated solution of $CaCl_2$. Regeneration and re-cycling of the Receiver solution is specifically described.

U.S. Pat. No. 5,824,223, granted Oct. 20, 1998 to Michaels et al. discloses use of a variety of oxy-phosphorus salts, as non-halide Receivers for application in OMD. The proposed compounds have the advantage of being highly soluble, non-toxic and non-corrosive.

U.S. Pat. No. 5,938,928, granted Aug. 17, 1999 Michaels A. N. discloses an OMD process for the concentration of juices and beverages, which utilizes a laminate membrane consisting of a hydrophobic microporous layer laminated with a thin non-porous hydrophilic film. Such laminate structure was shown to be effective in preventing wetting of the OMD membrane.

U.S. Pat. No. 6,383,386, granted May 7, 2002 to Hying et al. discloses ceramic microporous membranes coated with a hydrophobic agent in a context of membrane reactors as well as for OMD concentration of fruit juices.

U.S. Pat. No. 6,299,777 B1, granted Oct. 9, 2001 and U.S. Pat. No. 6,569,341 B2, granted May 27, 2003 to Bowser, John J. describe OMD processes which utilize non-porous, hydrophobic membranes made of high free-volume, perfluorinated polymer, such as perfluoro-2,2-dimethyl-1,3-dioxole. U.S. Pat. Nos. 6,299,777 and 6,569,341 teach that acceptable water vapor fluxes are realized with such high free-volume polymeric materials, while the materials also positively eliminate membrane wetting.

It should be noted that the prior art OMD processes operate not only at relatively low temperatures of about or below 50° C. in a non-heavy chemical environment, but also for, in effect, producing, in consequence of the OMD process, an "unwated" diluted "spent" receiver solution, which must be re-concentrated back to its original strength and recycled to the OMD process. Such additional treatment involves capital and operating costs. Thus, the prior art processes provide only a single benefit of desired product concentration, with its attendant aforesaid cost.

SUMMARY OF THE INVENTION

Surprisingly, we have found that efficacious and efficient re-concentration and concomitant dilution of aqueous solutions of heavy chemical processes by OMD can be effected at commercially-acceptable rates.

Further, we have found that said processes can be carried out for heavy chemical solutions at relatively high temperatures to provide capital and operating cost advantages.

The term "heavy chemical" in the industrial chemical production field is well-understood to mean chemicals produced on at least hundreds of kilogram scale, and generally tens of thousands of kilograms scale. This is distinct from the production of foodstuffs and fine chemicals, such as pharmaceuticals.

More specifically, the term "heavy chemical" in this specification is also restricted to the production of inorganic chemicals when manufactured in a heavy chemical process plant.

Accordingly, in one aspect the invention provides a method of enhancing the concentration of a first inorganic compound in a first aqueous solution of a first process of a heavy chemical plant, said method comprising (a) feeding said first solution having said first compound at a first concentration and a first water vapor pressure to an osmotic membrane distillation means comprising a hydrophobic, gas and water vapor permeable membrane separating (i) a first chamber for receiving said first solution, from (ii) a second chamber for receiving a receiver feed aqueous solution having a second water vapor pressure lower than said first water vapor pressure;

(b) feeding said receiver aqueous feed solution to said second chamber as to effect transfer of water vapor through said membrane from said first chamber to said second chamber, and to produce (i) a resultant first solution having a second concentration of said first compound greater than said first concentration and (ii) a diluted receiver feed aqueous solution; and (c) collecting said resultant first solution.

Accordingly, preferably in one aspect the invention provides a second process of said heavy chemical plant; and further collecting said diluted receiver feed aqueous solution.

The resultant first solution and diluted receiver feed solution are recycled back to the heavy chemical plant.

Preferably, the first solution is subject to the OMD step at a practical temperature selected from at least 50° C. to up to its boiling point. Clearly, the temperature is selected to provide a practical vapor pressure differential with the receiver solution.

We have found that the processes according to the invention are most valuable when both (a) the Spent (dilute) liquor to be concentrated, and (b) the Receiver liquor are provided within the confines of a heavy chemical process plant, or unit thereof, under the OMD step to advantageously provide both (a) the re-concentrated Spent liquor, and (b) the desired diluted Receiver liquor, for recycle within the chemical plant. Such an advantageous arrangement mitigates the capital and operating costs of the OMD step.

In a most preferred object of the present invention, convenient and inexpensive apparatus and methods of re-concentrating Spent Brine to Feed Brine, are provided.

Accordingly, in a further aspect, the invention provides as hereinabove defined is wherein said first compound is an alkali metal halide, and said alkali metal halide solution is spent solution from an electrolytic cell for the electrolytic production of halogen and alkali metal hydroxide from said alkali metal halide.

The preferred method according to the invention described herein takes advantage of a common situation in a chemical plant, especially chloralkali or sodium chlorate plant, where there are multiple process streams, which normally require addition of de-mineralized water and, hence, are potential Receivers (water sinks) for water vapor removed from Spent Brine. Such streams are described below as follows.

1. NaOH catholyte. Typically 30-33% w/w NaOH at 80-90° C. Water vapor partial pressure: 0.20-0.25 bar (0.01 bar at room temperature). Water is normally added to catholyte circulation loop to maintain the NaOH concentration.
2. NaOH used for bleach production (33% w/w NaOH requires dilution to 20% w/w NaOH). Temperature: 80° C. Water vapor partial pressure: 0.20-0.40 bar.
3. Concentrated raw brine. Typically 25-26% w/w NaCl at room temperature. Water vapor partial pressure: 0.01 bar (0.36 bar at 80° C.). Water is normally added to the brine saturator to make the concentrated raw brine.
4. Spent acid from $Cl_2$ drying stage. Typically 70% w/w $H_2SO_4$. Water vapor partial pressure: 0.002 bar at room temperature (0.03 bar at 80° C.).

The water vapor partial pressure over Spent Brine (16-17% w/w NaCl) is 0.02 bar at room temperature and 0.42 bar at 80° C., respectively.

It follows that considerable water vapor partial pressure driving force is realized by contacting Spent Brine with any of the above listed Receiver streams. For example, when Spent Brine is contacted, across the hydrophobic microporous membrane, with the NaOH catholyte receiver, the initial water vapor pressure driving force would be: 0.01 bar at room temperature and about 0.2 bar at 80° C., respectively.

To accomplish the desired re-concentration of Spent Brine, the method according to the invention employs Osmotic Membrane Distillation (OMD) wherein a process stream to be concentrated is contacted across a hydrophobic, preferably, microporous membrane, with a more concentrated stream, referred to herein as Receiver Stream or Receiver. The Receiver is characterized by having a lower water vapor pressure than the Process Stream. As long as the difference in water vapor pressures over the two streams is maintained, there will be a net water vapor transport to the Receiver.

There are two important features of the OMD process that should be appreciated, as follows.
1) In consequence of the small pore size of the membrane, typically, <0.5 μm and its hydrophobic character, there is no transfer of liquid solutions through it and that only gaseous components, which include water vapor, can permeate. In the case of Spent Brine re-concentration, this means that any dissolved or entrained chlorine will permeate together with water vapor, while the non-volatile solutes, including impurities, cannot be transferred between the Spent Brine and the Receiver.
2) Heat is consumed during evaporation of water from the Process Stream, while the same quantity of heat is released when the water vapor is condensed (absorbed) in the Receiver. The released heat is "recycled back", via thermal conduction across the membrane, to the Process Stream. Accordingly, the OMD process is considered to be isothermal.

Accordingly, in a preferred aspect, the invention provides a method of enhancing the concentration of alkali metal halide in an aqueous solution comprising
(a) feeding said alkali metal halide solution having an alkali metal halide first concentration and a first water vapor pressure to an osmotic membrane distillation means having a hydrophobic, gas and water vapor permeable membrane separating (i) a first chamber, for receiving said alkali metal halide solution, from (ii) a second chamber for receiving a receiver feed aqueous solution having a second water vapor pressure lower than said first vapor pressure;
(b) feeding said receiver aqueous feed solution to said second chamber as to effect transfer of water vapor through said membrane from said first chamber to said second chamber and produce a resultant alkali metal halide solution at a second concentration greater than said first concentration;
(c) collecting said resultant alkali metal halide solution; and
(d) preferably, the hydrophobic membrane is microporous.

In a preferred aspect, the invention provides an improved electrolytic process for the production of alkali metal hydroxide and halogen gas from an alkali metal halide solution, said process comprising electrolyzing said aqueous solution of said alkali metal halide in an electrolytic cell to produce said alkali metal hydroxide, gaseous halogen, and spent alkali metal halide solution, the improvement comprising subjecting at least a portion of said spent alkali metal halide solution having a spent vapor pressure to an osmotic membrane distillation means comprising a hydrophobic, gas and water vapor permeable membrane separating (i) a spent solution chamber for receiving said spent solution, from (ii) a receiver chamber for receiving an aqueous receiver feed solution having a receiver solution vapor pressure lower than said spent vapor pressure; and feeding said at least portion of said spent alkali metal halide solution to said spent solution chamber; feeding said receiver feed solution to said receiver chamber as to effect transfer of water vapor through said membrane from said spent solution chamber to said receiver chamber, to produce a resultant, more concentrated spent alkali metal halide solution, and a resultant less concentrated receiver feed solution.

Although, at the present time it is believed that OMD contactors, exemplifying the osmotic membrane distillation means, are not commercially available, other types of membrane contactors are available and can be adapted for the OMD process. For example, the Membrana Division of Celgard Corp. fabricates a contactor called Liqui-Cel™, which employs polypropylene (PP) fibers (0.3 mm OD, 0.03 μm mean pore size) woven into loose fabric, which is then inserted into a shell. One stream flows through the lumens of the PP hollow fibers, while the other stream flows generally on the shell side. This particular contactor uses a central feeding of the shell-side stream and a central baffle to ensure that at least part of the shell-side stream flows in the direction normal to the fibers. Liqui-Cel™ contactors were developed for gasifying/de-gasifying of liquid solutions or solvent extraction applications. Another example of a commercially available membrane contactor is a pHasor™ unit available from Mykrolis Corporation. This shell-and-tube contactor contains microporous PFA membrane capillaries and is primarily used for bubble-free gas transfer into fluids, especially transfer of ozone into semiconductor process streams. Yet another device adaptable as an OMD contactor is the Microza® unit, available commercially from Pall Corp. This unit is also of the shell-and-tube type and it incorporates a bundle of microporous PVDF capillaries as the membrane. The intended Microza® unit use is for a cross-flow microfiltration.

In general, membrane contactors may employ hollow-fiber, tubular i.e. capillary or flat membranes made of polymers mentioned hereinabove, in either microporous or non-porous form. The contactor configurations may be plate-and-frame type, spiral-wound or pleated—for flat type membranes. For tubular and hollow-fiber membranes, the shell-and-tube or transverse flow, wherein the Process Stream and the Receiver flow normally to each other, module types are more appropriate. As mentioned above, some membrane contactor fabricators have weaved or bonded individual hollow fibers, or capillaries, as mats or fabrics. They can then be handled in a similar fashion as flat membranes and packaged into, e.g. a spiral-wound module. In summary, it should be appreciated that diverse forms of membranes and membrane modules may be used in OMD. In each case, the membrane serves as a non-wettable barrier between the treated solution, e.g. Spent Brine and the Receiver, which transfers water vapor and other volatile components and conducts heat.

In a further aspect, the invention provides apparatus for enhancing the concentration of a first inorganic compound in a first aqueous solution having a first water vapor pressure provided by a first process of a heavy chemical plant by osmotic membrane distillation, said apparatus comprising osmotic membrane distillation means comprising
(i) a hydrophobic, gas and water vapor permeable membrane;
(ii) a first chamber for receiving said first solution; and
(iii) a second chamber for receiving a receiver feed aqueous solution having a second water vapor pressure lower than said first water vapor pressure and separated from said first chamber by said membrane means;
means for feeding said first solution to said first chamber and means for feeding said receiver feed aqueous solution to said second chamber as to operably effect transfer of water vapor through said membrane from said first chamber to said second chamber, and to produce
(i) a resultant first solution having a second concentration of said first compound greater than said first concentration, and
(ii) a diluted receiver feed aqueous solution;
means for collecting said resultant first solution; and
means for collecting said diluted receiver feed solution.

In a preferred further aspect, the invention provides apparatus for concentrating an alkali metal halide solution by osmotic membrane distillation comprising
(i) a hydrophobic, gas and water vapor permeable membrane;
(ii) a first chamber for receiving said alkali metal halide solution; and
(iii) a second chamber for receiving a receiver feed aqueous solution and separated from said first chamber by said membrane means;
means for feeding said alkali metal halide solution to said first chamber;
means for feeding said receiver feed aqueous solution to said second chamber;
means for collecting concentrated alkali metal halide solution from said first chamber; and
means for collecting diluted receiver feed aqueous solution.

Further, in a most preferred aspect, the invention provides an improved halo alkali production plant comprising
an electrolytic cell for the electrolytic production of alkali metal hydroxide and halogen from an alkali metal halide solution;
means for feeding feed alkali metal halide solution to said cell;
means for collecting spent alkali metal halide solution from said cell;
means for collecting said alkali metal hydroxide from said cell;
the improvement comprising
osmotic membrane distillation means comprising
(i) a hydrophobic, gas and water vapor permeable membrane;
(ii) a first chamber for receiving said spent alkali metal halide solution and wherein the production of re-concentrated alkali metal halide solution is effected; and
(iii) a second chamber for receiving a receiver feed aqueous solution, separated from said first chamber by said membrane and wherein the production of a diluted receiver feed aqueous solution is effected;
means for feeding said spent alkali metal halide solution to said first chamber;
means for feeding said receiver feed aqueous solution to said second chamber;
means for recycling said re-concentrated alkali metal halide solution in whole or in part, directly or indirectly from said first chamber to said electrolytic cell; and
means for collecting said diluted receiver feed aqueous solution from said second chamber.

BRIEF DESCRIPTION OF THE DRAWINGS

In order that the invention may be better understood, preferred embodiments will now be described, by way of example only, with reference to the accompanying drawings, wherein:

FIGS. (1)-(4) are schematic diagrams of chloralkali production plants incorporating Spent Brine re-concentration membrane contactor units, according to the invention; and wherein the same numerals denote like parts.

DETAILED DESCRIPTION OF PREFERRED EMBODIMENTS

Figure 1:
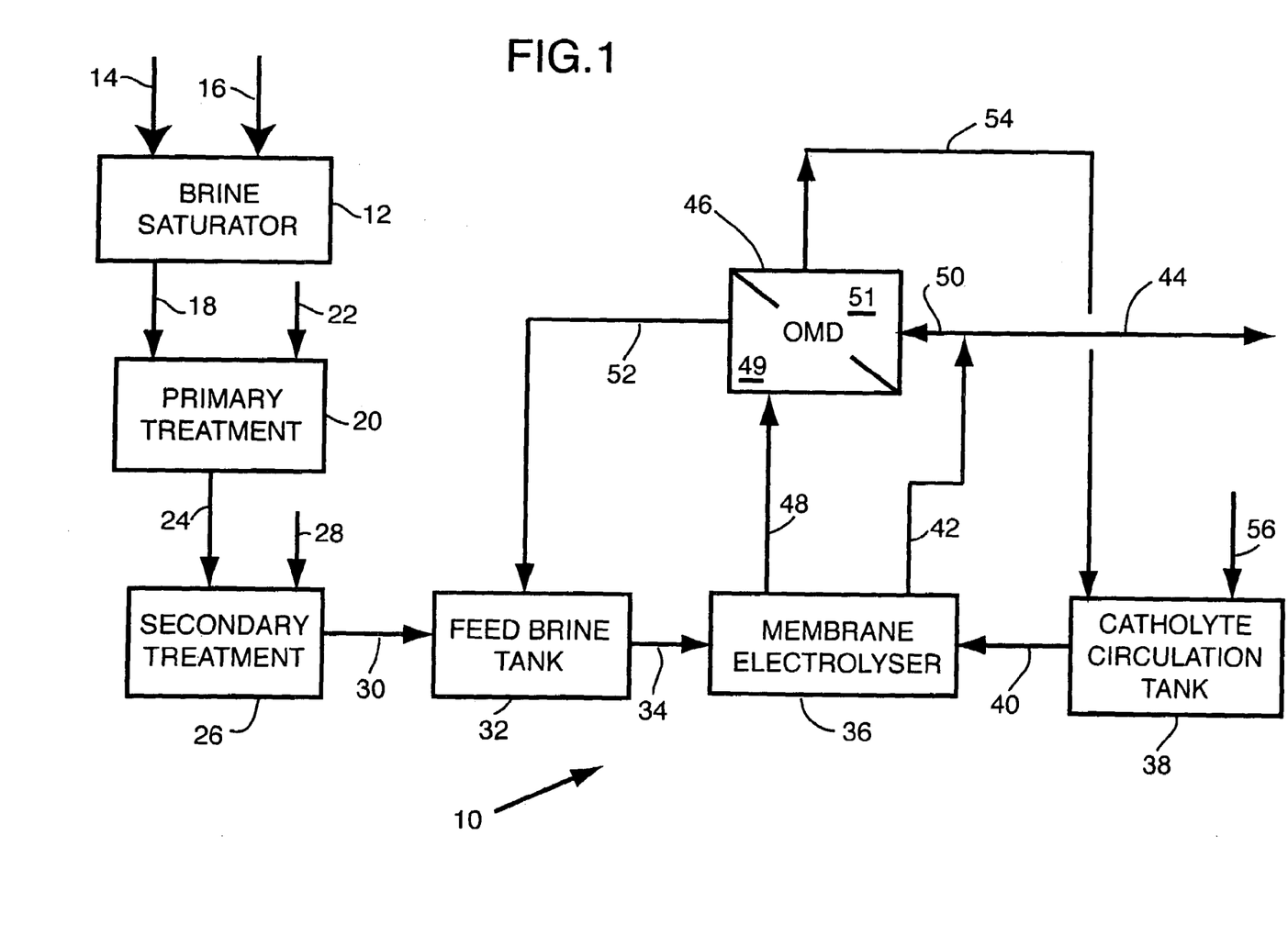

FIG. 1 shows a simplified diagram of a brine treatment train, electrolyzer and a catholyte re-circulation loop, generally as 10, wherein product sodium hydroxide catholyte solution is passed to the OMD unit as a Receiver "water sink", herein the second chamber of the OMD means.

Raw feed brine is prepared in a brine saturator 12, to which solid NaCl salt 14 and process water 16 are added. Saturated brine 18 is then passed to a primary brine treatment stage 20, where, upon the addition of treatment chemicals, NaOH and Na$_2$CO$_3$, denoted as 22, most of any hardness impurities are precipitated and the solids clarified and/or filtered out, to yield purified feed brine 24. To be suitable as a feed to the membrane cell chloralkali electrolyzer, the purified feed brine needs to undergo further purification or "polishing" in a secondary brine treatment 26, which utilizes chelating ion exchange resin IX to selectively remove trace multivalent cationic impurities from the brine. The IX resin is re-generated with HCl and NaOH, jointly denoted as regeneration chemicals 28. The "polished brine" 30 is pumped to feed brine tank 32 and then, upon demand, as stream 34, to the electrolysis section, designated as the membrane electrolyzer 36. Electrolyzer 36 is coupled with catholyte re-circulation tank 38, which feeds about 28-30% w/w NaOH to electrolyzer 36 as stream 40. Following electrolysis, the catholyte NaOH concentration increases to 32-33% w/w. Normally, part of this, as caustic stream 42 is collected as product caustic 44, while the balance is returned to 38. Similarly the Spent Brine stream would normally be returned back to brine saturator 12.

In this embodiment, the OMD contactor unit stage 46 is introduced to contact Spent Brine 48 in first chamber 49 of the OMD means, and the above mentioned balance of caustic product 50, in second chamber 51 to effect the osmotic transfer of water vapor from 48 to 50. As a result, the NaCl concentration of the Spent Brine in chamber 49 increases. This re-concentrated brine 52 can now be fed directly to feed brine tank 32 and bypass the conventional path through the aforesaid saturator and two brine treatment stages. Concomitantly, the NaOH concentration in chamber 51 and of caustic catholyte 50 decreases, as forming stream 54, which is returned to the catholyte re-circulation tank 38. Due to water pick-up from the Spent Brine, demineralized water makeup 56 to the catholyte is decreased with respect to that required in the absence of this OMD stage. For simplicity, the Spent Brine de-chlorination step, which might be required prior to the OMD stage has been omitted.

Figure 2:
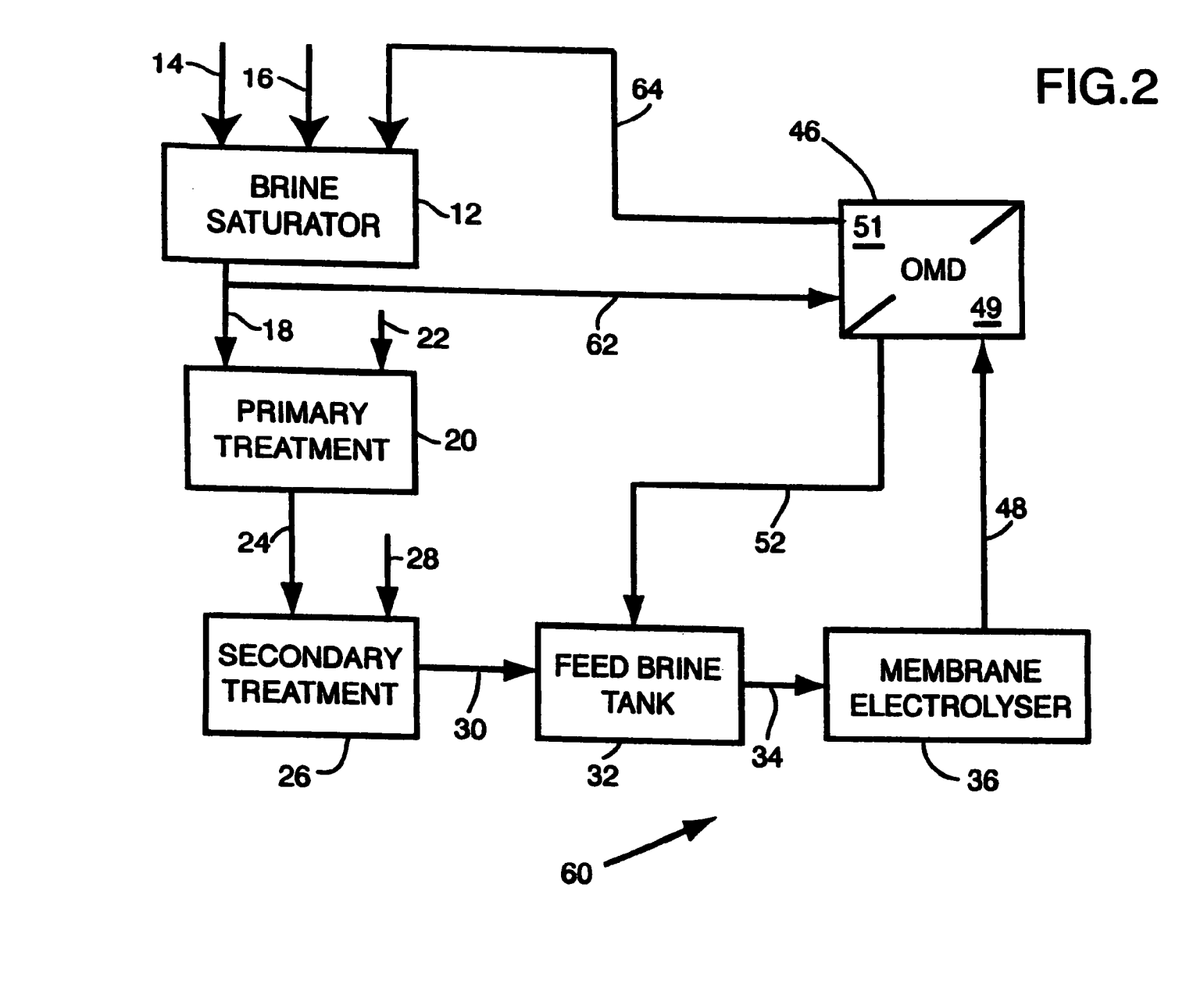

FIG. 2 shows, generally as 60, a configuration in which the Receiver is a concentrated raw NaCl brine 62, "water sink" split from stream 18, from the brine saturator 12. Following the osmotic pick-up of water, this brine gets diluted and is returned as stream 64 back to saturator 12. It follows that the input of process water stream 16, will be reduced in comparison with that required in the absence of the OMD stage. It should be appreciated that with this configuration, due to the higher partial water vapor pressure over saturated brine, the driving force for the OMD stage will be reduced, when compared with the process seen in FIG. 1, hereinabove.

Figure 3:
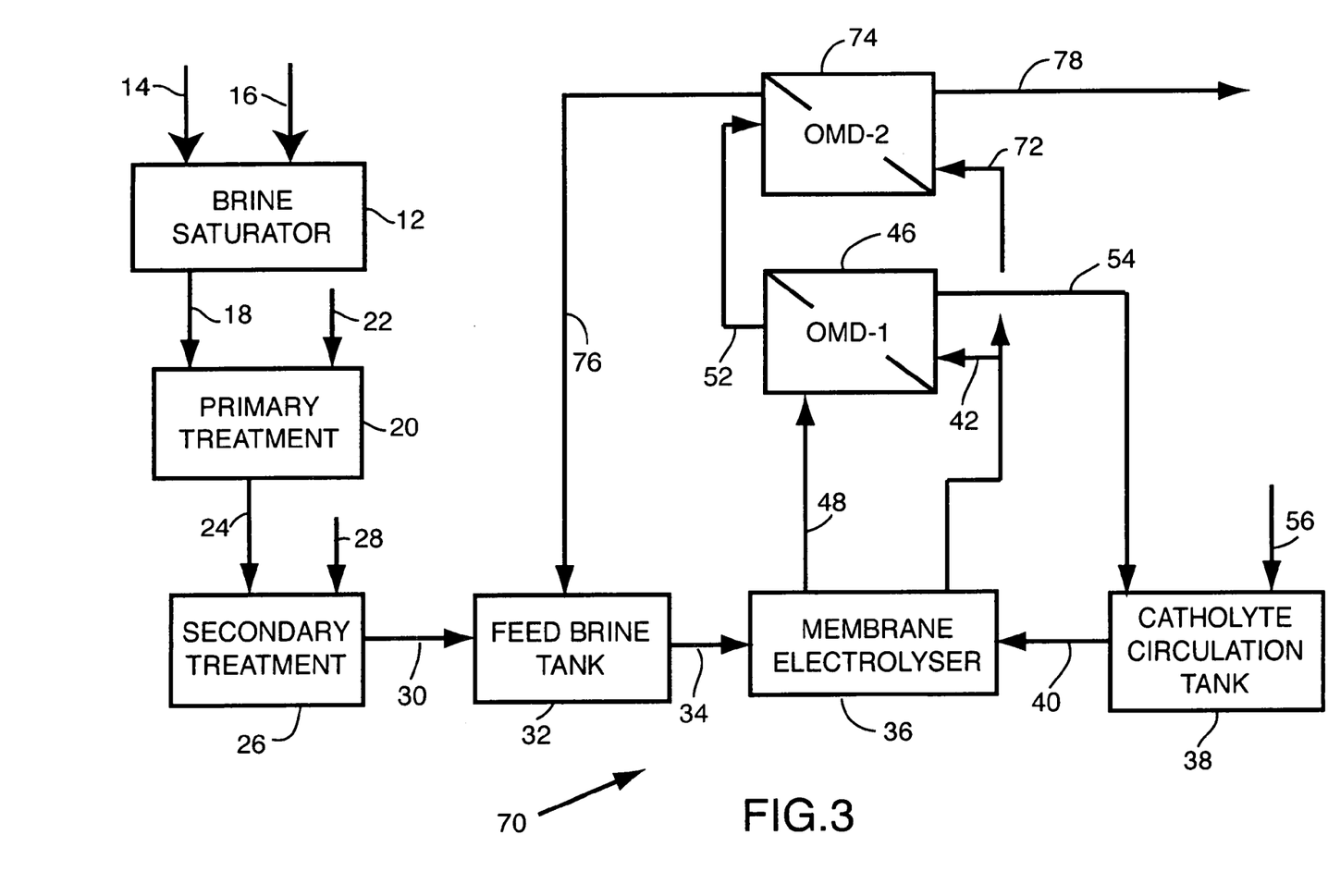

FIG. 3 shows, generally as 70, a chloralkali plant which produces liquid sodium hypochlorite bleach, wherein sodium hydroxide and product are the Receiver "water sink". In such a plant, a 32-33% w/w NaOH product is first diluted to about 20% w/w strength and then reacted with gaseous $Cl_2$ to make the NaOCl. This is a favorable case, since it poses the greatest de-mineralized water requirement for both caustic dilution in the catholyte loop, and the above mentioned product caustic dilution, before it is fed to the hypochlorite reactor. The increased de-mineralized water requirement translates to a larger water sink for the water to be extracted from the Spent Brine. In addition, in this case there is no need to de-chlorinate the Spent Brine prior to OMD stages—the residual chlorine in brine will be mostly stripped together with water vapor and absorbed in the caustic Receiver, forming small quantities of NaOCl. FIG. 3 shows two OMD stages. A part of the catholyte caustic product stream 42 is split-off as product caustic 72, which undergoes "deep" dilution in one OMD-2 stage 74, while the balance of caustic is moderately diluted in OMD-1 stage 46 and then returned to the catholyte re-circulation tank as stream 54. Spent Brine 48 flows first through OMD-1 and is concentrated to an intermediate level in stream 52. Further brine concentration occurs in OMD-2 resulting in fully re-concentrated brine stream 76. The dilute caustic stream 78 is pumped to a hypochlorite reactor (not shown). It should be emphasized that the OMD stages could be arranged in many different ways. For example, Spent Brine 48 may first be contacted with the product caustic stream 72 and then with the re-circulating catholyte 42. Likewise Spent Brine 48 may be fed in parallel to both OMD stages, rather than in series, as shown.

Figure 4:
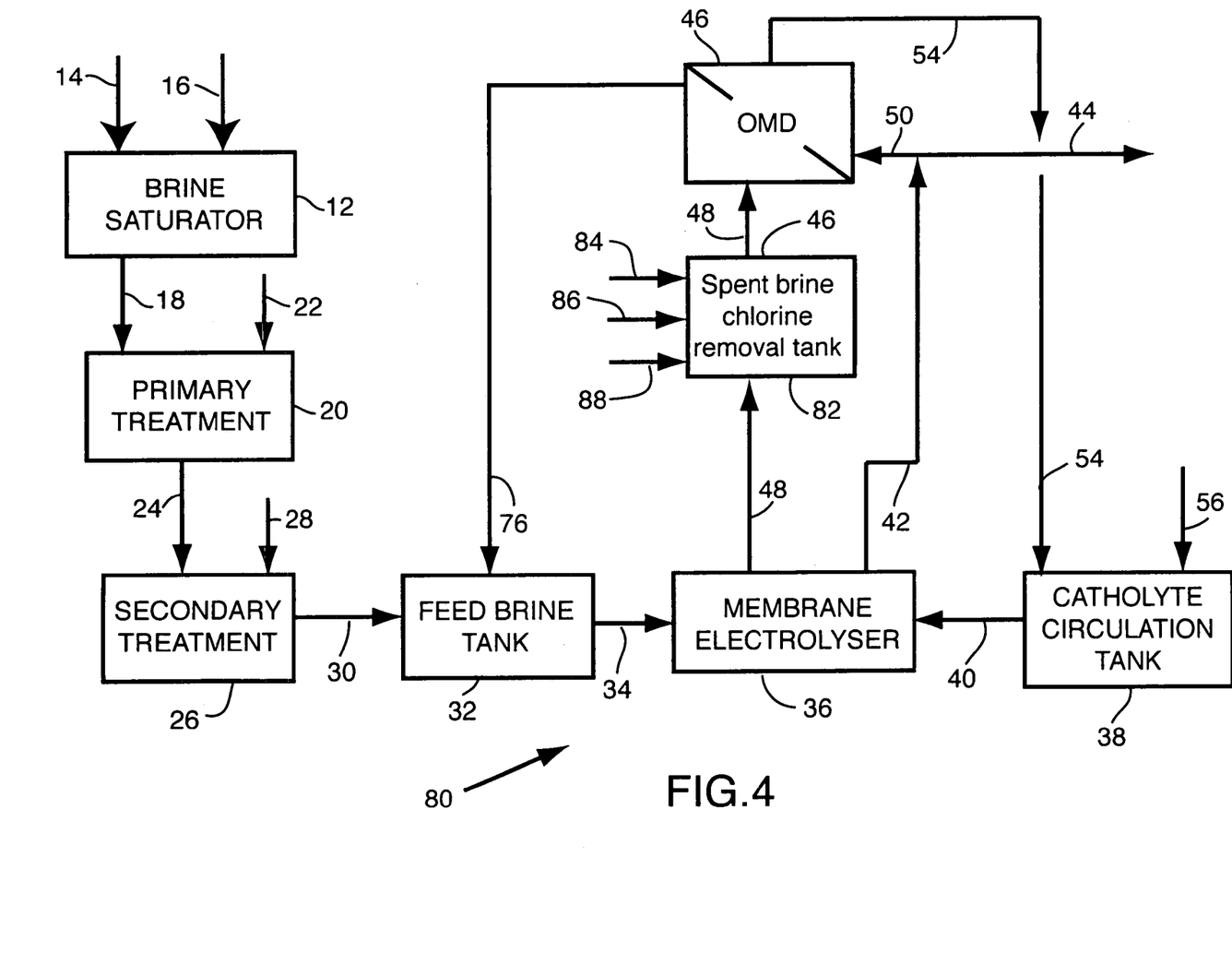

FIG. 4 depicts, generally as 80, the embodiment of FIG. 1, except it now explicitly shows a Spent Brine de-chlorination stage 82. De-chlorinating chemicals HCl, NaOH and $Na_2SO_3$ are shown as streams 84, 86 and 88, respectively.

It is to be understood that other Receivers and combination of Receivers can be used to extract water from Spent Brine by the OMD method. As mentioned, hereinabove, spent acid from the chlorine drying stage can advantageously be employed, either alone or in combination with other Receivers. In general, the most effective Receivers are those characterized by the lowest water vapor partial pressure at a given temperature. Further, it is advantageous to operate at higher temperatures, since this tends to increase the effective water vapor partial pressure difference between Spent Brine and the Receiver. The upper OMD operating temperature limit is defined by the materials of construction in the OMD module, particularly the membranes and potting material.

In addition to the partial water vapor pressure driving force, the design of the module is important for achieving high rates of water vapor transfer per available membrane area. The inherent water vapor transfer through the membrane pores is unlikely to be a limiting factor, but concentration polarization on the Spent Brine and Receiver sides will contribute to decreasing the effective water vapor pressure driving force for the process. Similarly, it is important to ensure rapid thermal equilibration between the Spent Brine and Receiver streams, i.e. to avoid temperature polarization. To minimize both concentration and temperature polarization, the contacted streams should be re-circulated rapidly through the OMD modules. Means to increase the turbulence of the solutions at the OMD membrane are preferred. Examples of turbulence promoters, such as baffles, air-sparging, pulsated pumping, and the like may be used. A transverse flow OMD module design, in which at least one of the contacting streams flows normally to the membrane e.g. in a membrane hollow-fiber, is believed to be a more efficient OMD contactor when compared with a conventional shell-and-tube type using co- or counter-current flows.

EXAMPLES

All listed experiments were done using a commercial Microza® tube-and-shell microfiltration unit as the OMD contactor. The relevant specifications for this unit are listed below:

| | |
|---|---|
| Module OD: | 48 mm |
| Membrane form/material: | Capillary/PVDF |
| Membrane OD/ID: | 2.3/1.4 mm |
| # of capillaries | 140 |
| Membrane area: | 0.12 $m^2$ (based on ID) |

Example 1

Spent brine (18% w/w NaCl) was pumped on the shell side of Microza® unit at 2.7 ml/min (linear velocity: ~0.5 cm/sec), while 30.5% w/w NaOH Receiver solution was pumped through the lumen side of the PVDF capillaries at 2.5 ml/min (linear velocity in each capillary ~1.2 cm/sec). Spent brine and Receiver temperatures were varied but kept equal to each other. In the process the Spent brine became concentrated to the 25-26% w/w level. The estimated initial differential water vapor pressure difference (driving force) was 0.080 bar at 30° C. and 0.080 bar at 60° C., respectively. The measured water transfer rates were as follows:

| Temperature, ° C. | $H_2O$ transfer rate, kg/$m^2$ hr |
|---|---|
| 22 | 0.42 |
| 35 | 0.80 |
| 45 | 1.00 |
| 55 | 1.25 |
| 65 | 1.50 |

Example 2

Conditions were similar to that in Example 1 except that the temperature was fixed to 73° C. and the lumen side flow was increased to 7.6 ml/sec (~3.5 cm/sec), while the shell side flow (Spent brine) was varied. The measured water transfer rates were as follows:

| Shell side flow, ml/sec | $H_2O$ transfer rate, kg/$m^2$ hr |
|---|---|
| 6.6 | 2.25 |
| 8.5 | 2.90 |
| 10.0 | 3.30 |

Example 3

Gore-Tex® tubular PTFE® membranes were used in a membrane contactor of the undisclosed flow-type configuration for OMD process. Some description of the membrane module and membranes are given in Table 1.

TABLE 1

Gore-Tex tubular membranes and a membrane module used in the experiments.

| Membrane form/material | Tubes/PTFE |
|---|---|
| Active area of the membrane module based on the tube-side | 1.1 $m^2$ |
| Active tube length | 43.1 cm |
| Porosity of membranes | ~50% |
| Membrane tube ID | ~0.55 mm |
| Membrane tube OD | ~0.80 mm |
| Membrane tube thickness | ~0.125 mm |

Spent brine (17.5 wt.% NaCl) was pumped on the shell side of the membrane contactor comprising Gore-Tex tubular membranes at a linear velocity of ~7.4 cm/sec. Receiver solution comprising 30% NaOH was pumped through the tube-side of the PTFE tubular membranes at a linear velocity of ~21 cm/sec per each tube. Spent brine and Receiver temperatures were varied but kept equal to each other (see a table further below):

| Temperature, ° C. | $H_2O$ transfer rate, kg/$m^2$ hr |
|---|---|
| 50 | 1.24 |
| 60 | 3.82 |
| 70 | 5.56 |

In the process the Spent brine became concentrated to ~19% wt. The estimated initial water vapour pressure difference (driving force) ranged between ~0.048 and 0.122 Bar.

Example 4

Conditions were similar to that of the Example 3 except that the temperature was fixed at 75° C. Initial concentration of the Receiver solution was 30 wt %. The initial concentration of the Spent Brine varied as follows (see table further below):

| Initial Spent brine concentration, wt. % | $H_2O$ transfer rate, kg/$m^2$ hr |
|---|---|
| 18.9 | 4.79 |
| 20.8 | 3.85 |
| 22.9 | 3.77 |

In the process the Spent brine became concentrated to ~25% wt. The estimated initial water vapour pressure difference (driving force) ranged between ~0.130 and 0.145 Bar.

Example 5

Conditions were similar to that of the Example 4, that is, temperature was fixed at 75° C. The linear velocity of the Spent Brine was 6.7 cm/sec. The linear velocity of the Receiver solution was 28 cm/sec per tube. Initial concentration of the Spent brine was 19% wt. Initial concentration of Receiver solution varied as follows (see table further below):

| Initial Receiver (NaOH) concentration, wt. % | $H_2O$ transfer rate, kg/$m^2$ hr |
|---|---|
| 27.75 | 3.90 |
| 28.38 | 4.10 |
| 29.15 | 4.40 |
| 30.25 | 4.60 |

The estimated initial water vapour pressure difference (driving force) ranged between ~0.109 and 0.151 Bar.

Example 6

A bundle of the HALAR® (ECTFE) capillaries epoxy-potted from both sides and submerged into a container with Spent Brine was used to evaluate membrane efficiency for Spent Brine re-concentration. Some description of the membrane capillaries and a membrane bundle are given in Table 2.

TABLE 2

Halar ® capillary membranes and a membrane bundle used in the experiments.

| Membrane form/material | Capillaries/HALAR ® |
|---|---|
| Active area of the membrane bundle | 0.15 $m^2$ |
| Active capillary length | 17.5 cm |
| Membrane ID | 0.39 mm |
| Membrane OD | 0.65 mm |
| Membrane tube thickness | 0.13 mm |
| Nominal Pore Size | 0.1 μm |

Initial concentration of Spent Brine was 18% wt. NaCl. Spent Brine was pored in a container which was placed in a water bath at 70° C. Spent Brine was stirred by a magnetic stirrer at 500 RPM. A bundle of the Halar® membrane capillaries was submerged in the NaCl solution. Initial concentration of the Receiver Solution was 31.5% NaOH. It was fed into the lumen of the membrane capillaries at 70° C. The linear velocity of NaOH solution was set at 2.4 or 14.4 cm/sec per membrane cappilary. The water transfer rates obtained are given in the following table (see further below):

| Linear velocity of NaOH solution, cm/sec | $H_2O$ transfer rate, kg/$m^2$ hr |
|---|---|
| 2.4 | 3.16 |
| 14.4 | 5.56 |

The estimated initial water vapour pressure difference (driving force) was ~0.102 Bar.

Example 7

In this set of experiments the membrane and a membrane contactor used were the same as described in Example 3 (e.g., tubular Gore-Tex PTFE membranes). DI water was fed in the shell side of the membrane contactor at 6.7 cm/sec at various temperatures. Receiver Solution was fed into the lumen of the tubes at ~28 cm/sec per tube at the same temperatures as water feed. Initial concentration of the Receiver Solution slightly varied but was approximately 30% wt and measured each time before an experiment. The following table presents water transfer rates obtained at various water vapour pressure differences (see table further below):

| $H_2O$ vapour pressure differences, Bar | $H_2O$ transfer rate, $kg/m^2$ hr |
|---|---|
| 0.104 | 4.0 |
| 0.130 | 4.9 |
| 0.151 | 6.0 |

Further enhancement of the water transfer rate may be achieved by:

Membrane optimization using thinner material and with higher porosity, but without increasing the nominal pore size above 0.2 μm;

Module optimization by transverse flow configuration, higher flow velocities and more turbulence a;t the membrane/solution interface;

Operating at higher temperatures e.g. up to 90° C. operation is possible within chloralkali plant without additional heating; and Using small auxiliary heaters to optimize the temperature profile across the membrane to mediate the temperature polarization effects.

The above experiments demonstrate that the rate of the OMD process is strongly dependent on the operating temperature. A strong dependence on the Spent Brine and Receiver flow rates indicated a further control by concentration and possibly temperature polarization at the membrane solution interface.

Thus, the present invention provides apparatus and processes for the re-concentration of a spent aqueous solution of a chemical process stream of a heavy chemical plant in an efficacious and efficient manner, optionally at not hithertobefore relatively high temperatures and harsh conditions.

Most preferably, the water transformed by the OMD process is used, concomitantly, as desired dilution water for another process stream which forms part of the full chemical plant. Such action reduces or eliminates the need for and cost of fresh demineralized or like "make-up" water, or a "dedicated" Receiver and reconditioning of the Receiver.

Surprisingly, and advantageously, the rate of re-concentration can be enhanced by operations at relatively high temperatures not acceptable in prior art commercial operations owing to the temperature sensitivity of the chemical compounds. Such high temperatures enhance water vapor pressure differences between the solutions to maximize the OMD rates.

Further, such high temperature operations allow for the utilization of the "already hot" process streams in the OMD step, such that essentially no net heat is either generated or consumed, and, thus, the costs of cooling and/or heating steps are either eliminated or reduced. This is particularly so where there is no ready available source of energy e.g. high or low pressure steam.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

The invention claimed is:

1. A method of enhancing the concentration of a first inorganic compound in a first aqueous solution of a first process of a heavy chemical plant including an electrolyzer, said method comprising
   (a) feeding said first solution having said first compound at a first concentration and a first water vapor pressure to an osmotic membrane distillation means comprising a hydrophobic, gas and water vapor permeable membrane separating (i) a first chamber for receiving said first solution, from (ii) a second chamber for receiving a receiver feed aqueous solution having a second water vapor pressure lower than said first water vapor pressure;
   (b) feeding said receiver aqueous feed solution to said second chamber as to effect transfer of water vapor through said membrane from said first chamber to said second chamber, and to produce (i) a resultant first solution having a second concentration of said first compound greater than said first concentration and (ii) a diluted receiver feed aqueous solution;
   (c) collecting said resultant first solution; and
   (d) recycling at least a portion of one or both of said solutions selected from said resultant first solution and said diluted receiver feed aqueous solution within said heavy chemical plant to said electrolyzer.

2. A method as defined in claim 1 wherein said receiver feed aqueous solution is provided by a second process of said heavy chemical plant; and further collecting said diluted receiver feed aqueous solution.

3. A method as defined in claim 1 wherein both of said resultant first solution and said diluted receiver feed aqueous solution are re-cycled back within said heavy chemical plant to said electrolyzer.

4. A method as defined in claim 1 wherein said first solution is at a temperature selected from at least 50° C. and less than its boiling point.

5. A method as defined in claim 4 wherein said receiver feed aqueous solution is at a temperature selected from at least 50° C. and 80° C.

6. A method as defined in claim 1 wherein said membrane is microporous.

7. A method as defined in claim 6 wherein said membrane has a pore size of <0.5 μm.

8. A method as defined in claim 1 wherein said hydrophobic membrane is characterized by high free volume and is non-porous.

9. A method as defined in claim 1 wherein said first compound is an alkali metal halide, and said alkali metal halide solution is spent solution from an electrolytic cell or the electrolytic production of halogen and alkali metal hydroxide from said alkali metal halide.

10. A method as defined in claim 9 wherein said alkali metal halide is sodium chloride.

11. A method as defined in claim 1 wherein said receiver feed aqueous solution comprises a solution selection from the group consisting of (i) concentrated brine; (ii) concentrated sodium hydroxide; and (iii) spent sulphuric acid from a chlorine drying process.

12. A method as defined in claim 9 wherein said receiver feed aqueous solution is a product solution from an electrolytic cell for the electrolytic production of said alkali metal hydroxide.

13. A method as defined in claim 12 wherein said receiver feed aqueous solution is selected from sodium hydroxide of a catholyte re-circulation loop, and product sodium hydroxide suitable in the preparation of sodium hydroxide bleach.

14. A method as defined in claim 9 wherein said resultant alkali metal halide solution is brine having a second concentration of at least 22% w/w.

15. A method as defined in claim 9 wherein said alkali metal halide solution comprises sodium chloride and chlorine, and further comprising dechlorinating said solution occurring concurrently in said osmotic membrane distillation means.

16. A method as defined in claim 1 wherein said osmotic membrane distillation means comprises a plurality of said osmotic membrane distillation means units linked in parallel and/or series.

17. A method as defined in claim 1 further comprising subjecting said solution in said first chamber and/or second chamber to agitation selected from the group consisting of air-sparging, turbulence-promoters and pulsated flow.

18. A method as defined in claim 1 wherein said osmotic membrane distillation means comprises a unit selected from the group consisting of a plate-and-frame means, shell-and-tube means, and pleated or transverse-flow design membrane contactor means.

19. An improved electrolytic process for the production of alkali metal hydroxide and halogen gas from an alkali metal halide solution, said process comprising electrolyzing said aqueous solution of said alkali metal halide in an electrolytic cell to produce said alkali metal hydroxide, gaseous halogen, and spent alkali metal halide solution, the improvement comprising subjecting at least a portion of said spent alkali metal halide solution having a spent water vapor pressure to an osmotic membrane distillation means comprising a hydrophobic, gas and water vapor permeable membrane separating (i) a spent solution chamber for receiving said spent solution from (ii) a receiver chamber for receiving an aqueous receiver feed solution having a receiver water vapor pressure lower than said spent water vapor pressure; and feeding said at least portion of said spent alkali metal halide solution to said spent solution chamber; feeding said receiver feed solution to said receiver chamber as to effect transfer of water vapor through said membrane from said spent solution chamber to said receiver chamber, to produce a resultant, more concentrated spent alkali metal halide solution, and a resultant less concentrated receiver feed solution.

20. A process as defined in claim 19 wherein said receiver feed aqueous solution comprises a solution selected from the group consisting of (i) concentrated brine; (ii) concentrated alkali metal hydroxide; and (iii) spent sulphuric acid from a chlorine drying process.

21. A process as defined in claim 19 wherein said receiver feed solution contains an alkali metal hydroxide.

22. A process as defined in claim 21 wherein said alkali metal hydroxide is sodium hydroxide.

23. A process as defined in claim 19 wherein said receiver feed solution comprises at least a portion of said alkali metal hydroxide from said electrolytic cell.

24. A process as defined in claim 19 wherein said resultant, more concentrated spent alkali metal halide solution is recycled to said electrolytic cell.

25. An improved haloalkali electrolytic production process using an electrolytic cell for producing alkali metal hydroxide and halogen from an alkali metal halide solution, said process comprising electrolysing feed alkali metal halide solution in said cell to produce halogen, alkali metal hydroxide, hydrogen and spent alkali halide solution; the improvement comprising (a) feeding in whole or a portion of said spent alkali halide solution having a spent water vapor pressure and a spent alkali halide concentration to an osmotic membrane distillation means comprising a hydrophobic, gas and water vapor permeable membrane separating a first chamber for receiving said spent alkali halide solution from a second chamber for receiving a receiver feed aqueous solution having a receiver water vapor pressure lower than said spent water vapor pressure;

(b) feeding said receiver aqueous solution to said second chamber as to effect transfer of water vapor through said membrane from said first chamber to said second chamber, and produce a re-concentrated spent alkali halide solution and a diluted receiver solution; and (c) recycling said re-concentrated spent alkali halide solution, in whole or in part, directly or indirectly, back to said electrolytic cell.

26. A process as defined in claim 25 comprising feeding in whole or in part said alkali metal hydroxide as constituting said receiver feed aqueous solution to said receiver.

27. A method as defined in claim 1 wherein said diluted receiver feed aqueous solution is recycled within said heavy chemical plant to said electrolyzer.

* * * * *